United States Patent
Pardo (10) Patent No.: US 6,238,105 B1
(45) Date of Patent: May 29, 2001

(54) PROCESSOR/MEMORY NON-INTENSIVE RENDERING FOR PAGE PRINTERS

(75) Inventor: Luis Trabb Pardo, Palo Alto, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 08/931,225

(22) Filed: Sep. 16, 1997

Related U.S. Application Data (63) Continuation of application No. 08/497,477, filed on Jul. 3, 1995.
(51) Int. Cl.[7] .................................................. G06K 15/00
(52) U.S. Cl. ......................................... 395/116; 395/114
(58) Field of Search ..................................... 395/101, 112, 395/114, 115, 116, 117; 358/261.1, 261.2, 261.3, 261.4, 426, 427, 432, 433, 429, 539–540; 345/202; 382/232, 233, 234, 235, 272, 244–246, 166

(56) References Cited

U.S. PATENT DOCUMENTS

| | | |
|---|---|---|
| 5,150,454 | 9/1992 | Wood et al. . |
| 5,170,445 * | 12/1992 | Nelson et al. ..................... 358/261.1 |
| 5,367,383 * | 11/1994 | Godshalk et al. .................... 358/443 |
| 5,553,200 * | 9/1996 | Accad .................................. 395/114 |

FOREIGN PATENT DOCUMENTS

| | | |
|---|---|---|
| 0 470 782 | 2/1992 | (EP) . |
| 0 473 341 | 3/1992 | (EP) . |
| 0 597 571 | 5/1994 | (EP) . |

* cited by examiner

Primary Examiner—Arthur G. Evans
(74) Attorney, Agent, or Firm—Skjerven Morrill Macpherson LLP (57) ABSTRACT

Memory storage and memory bandwidth requirements of a color laser printer (or other printer having real-time printing constraints) are reduced by representing image information in a compressed format throughout the rendering process. At any one time during the rendering process, preferably, only a single scan line is expanded to the full, uncompressed format required for eventual printing. The rendered scan line is then recompressed and stored in memory. When all scan lines have been processed and are stored in memory in compressed format, the entire image is then expanded in real time and sent to the printer.

11 Claims, 8 Drawing Sheets

```
lg <- RepLg
while ( lg > 0 ) {
    if ( StringFlag == true )
        color <- P[x]
    C[x] <- color
    x <- x + 1
    lg <- lg - 1
}
```

*FIG._10*

```
lg <- RepLg
while ( lg > 0 ) {
    if ( StringFlag == true )
        color <- P[x]
    else
        P[x] <- Color
    out <- Color
    x <- x + 1
    lg <- lg - 1
}
```

```
x <- 0
while ( x < lineWidth ) {
        if ( C[x] == P[x] ) {
                StringFlag <- true
        } else {
                StringFlag <- false
                Output ( <Set Color I C[x]> )
        }
        color <- C[x]
        x <- x + 1
        lg <- 0
        if ( StringFlag == true) {
                // Loop 1
                while ( x < lineWidth && C[x] == P[x] && C[x] == color) {
                        lg <- lg + 1
                        x <- x + 1
                }
                if ( x < lineWidth ) {
                        // Loop 2
                        if ( C[x] == P[x] ) {
                                Output ( <Copy String> )
                                while ( x < lineWidth && C[x] == P[x] ) {
                                        lg <- lg + 1
                                        x <- x + 1
                                }
                        // Loop 3
                        } else {
                                Output ( <Copy Color> )
                                while ( x < lineWidth && C[x] == color ) {
                                        lg <- lg + 1
                                        x <- x + 1
                                }
                        }
                } else {
                        Output ( <Copy String> )
                }
        } else {
                // Loop 4
                while ( x < lineWidth && C[x] == color ) {
                        lg <- lg + 1
                        x <- x + 1
                }
        }
        if ( lg > 0 )
                Output( <Repeat I lg> )
}
Output( <End of Line> )
```

PROCESSOR/MEMORY NON-INTENSIVE RENDERING FOR PAGE PRINTERS

This is a continuation of application Ser. No. 08/497,477, filed Jul. 3, 1995.

BACKGROUND OF THE INVENTION

1. Field of the Invention

The present invention relates to the rendering of images for printing on printers, especially page printers such as laser printers and more especially color laser printers.

2. State of the Art

In recent years, increasingly greater computing power has been made available in desktop computers. At the same time, the sophistication of printing capabilities available to the average computer user has also increased. Laser printers offering near-typeset quality are commonplace in the business sector. Moderate-resolution color printers offering reasonable color performance have begun to be affordable by a large class of users.

In accordance with the foregoing trend, the demand for photo-realistic and near-photo-realistic color printers is expected to increase. Presently, color printers are generally one of several different types: thermal transfer, dye sublimation, ink jet, and laser. Thermal transfer offers lower quality and speed. Dye sublimation printers offer good quality but are slow and expensive. Inexpensive ink jet printers are slow and produce low-quality output. More expensive ink jet printers, although still slow, produce good quality output for larger pictures. As compared to color ink-jet printers, however (which account for the bulk of color printers presently sold), color laser printers hold great promise for achieving photo-realistic color output at high printing speed and low cost per copy.

Printers (as opposed to plotters) operate by forming small dots (also referred to as pixels) in a pattern on the page. In laser printers, these small dots are formed by scanning a laser beam in a scan direction across a photosensitive drum. (The image on the photosensitive drum is then developed, transferred to, and fixed on the actual page.) Typically, scanning is accomplished using a rotating polygonal mirror on which the laser is shined. Each facet of the mirror causes the laser beam to be scanned once across the photosensitive drum. During a scan, the laser beam is modulated, i.e., turned on and off, so as to either expose a dot at a particular location within the scan or not expose a dot. The photosensitive drum moves at a constant speed during scanning, in a paper advance direction, so as to cause successive scans to be displaced. The amount by which successive scan lines are displaced is called the line pitch.

The collection of dots in a scan line is referred to as a raster scan line. A group of successive scan lines is referred to as a band, or scan line swath. The collection of all the dots in all of the scan lines on a page is called a raster image. A collection of dots to be printed within a particular (and usually rectangularly shaped) area of the page is referred to as a pixel map. For example, on a color brochure, a company's logo might be defined as a pixel map and printed across the top of the page.

As opposed to the ink-jet printer, which is an example of a banded (scan-line swath) device, a laser printer is inherently a page device. That is, once laser printing has started (i.e., laser scanning of the drum has begun), it cannot be stopped or paused but must continue to completion without interruption. Although ink jet printers have certain real time data requirements with respect to a single band, the laser printing operation has more stringent real time data requirements that must be met for a satisfactory print to be produced, in that data has to be available for the entire page.

Conventionally, a laser printer consists of a printer controller and a print engine. The print engine exposes and develops dots on the physical page. The printer controller provides printer commands and print data to the print engine to cause it to print the desired page. The printer controller receives from an application program a page description in a page description language (PDL) such as Postscript™ from Adobe Systems, for example.

Ordinarily, printer controllers receive PDL statements from an application program and interpret those by means of a PDL interpreter. PDL interpreters usually preprocess PDL statements by computing the actual shapes and positions for the graphic objects associated with the statement and then apply those graphic objects to the page raster image by means of a marking interface. This interface consists of a generally proprietary, but usually well-understood, set of operations called rasterization requests. The Marking Interface passes the rasterization requests to a subsequent rasterization process. For example, a PDL interpreter might use the following set of rasterization requests (denoted "RAST") to describe the raster image for a page:

RAST1: Apply a rectangular pixel array of a given color (for text application).

RAST2: Fill in a trapezoidal area with a given color (area graphics).

RAST3: Expand (magnify, rotate, scale, skew, etc.) an image and apply it to the raster.

The present invention is also applicable to graphic environments such as Microsoft Windows, Apple Macintosh, etc., from which graphic commands (unlike PDL statements) are issued. These graphics commands can be similarly processed into rasterization requests by graphic command processors. And, in some cases, these environments directly generate rasterization requests of a well-known and publicly available format.

In conventional PDL interpreters, rasterization requests are typically organized in one of three principal ways. A first way of organizing rasterization requests involves sorting requests into a display list. Requests are commonly sorted in increasing order of y coordinate. For example, the following requests might be received from a PDL source, in the order listed:

1. Describe triangle
2. Draw it at (x3, y2)
3. Choose Font 1
4. Set string "AB" at (x1, y1)
5. Choose Font 2
6. Set string "C" at (x4, y3)

Figure 1:
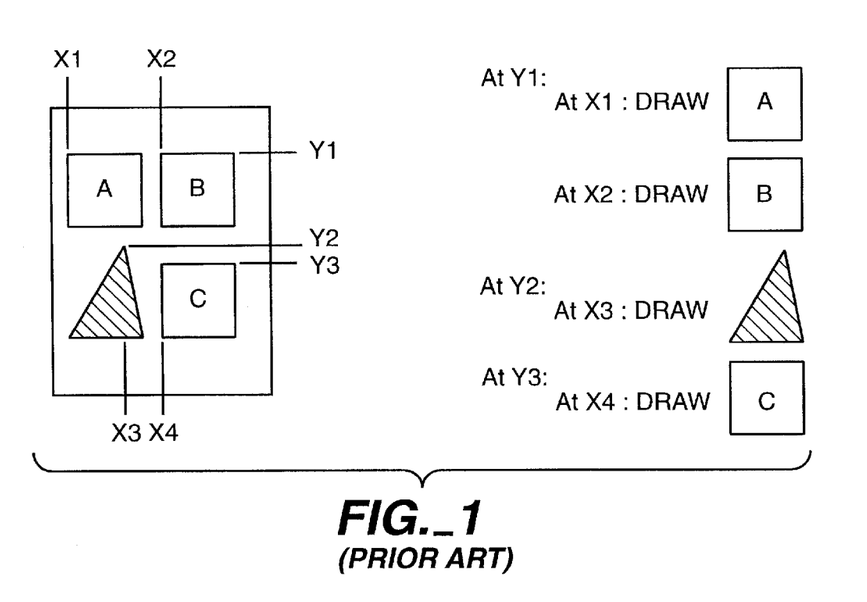
FIG. 1 is an illustration of a page and a corresponding sorted display list.

The corresponding page, together with a sorted display list, is shown in FIG. 1. As seen therein, the display list is sorted first by y coordinate, then, secondarily, by x coordinate.

Figure 2:
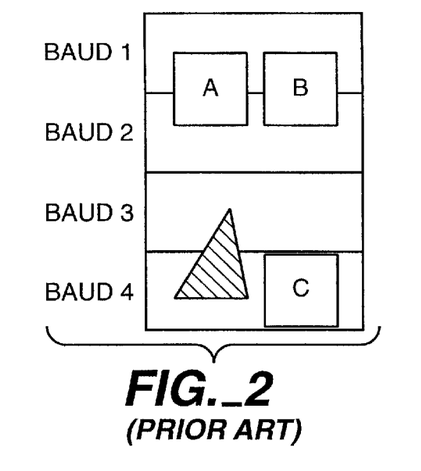
FIG. 2 is an illustration of the page of FIG. 1 divided into bands.

A second way of organizing rasterization requests involves dividing the page into bands as shown in FIG. 2. For each band, a separate display list is built. This technique and the previous technique are similar in that a page may be considered as a tall band. Collectively, the display lists for bands may be larger, however, than the display list for a full page (because the same print element may overlap bands, requiring it to be included in each). Since the size of the display list is, in principle, unbounded, a sequence of display lists may be generated instead, thus requiring multiple rasterization passes over each band. In either case the resulting raster is the same.

A third way of organizing rasterization requests involves simply creating an unsorted set of requests. This manner of organization requires that the rasterizer system keep an increasing list of randomly accessible scan lines. Various ways of saving memory have been devised, for example by only allocating those scan lines that are really being used, and even allocating rectangular patches of the raster on demand. In general, however, the rasterizer must effectively have access to a full bitmap. A significant advantage of this approach is that no display list needs to be created.

A single high-resolution, full-color image can require hundreds of megabytes of memory to store. In order to print such an image using a color laser printer, the entire image must be rendered and stored in memory at a single time to avoid the possibility of delays in supplying image data to the print engine (under-runs).

This requirement of laser printing imposes extreme memory storage and memory bandwidth requirements on a high-resolution, full-color laser printer. Such printers have therefore been quite expensive. In the prior art, the entire image or at least an image band is rasterized and stored. The stored rasterized image or image band is then retrieved and compressed. Finally, the compressed image or image band is then stored for later expansion and output to the print engine. As a result, each pixel of the image is handled multiple times. Both memory requirements and memory bandwidth requirements are large.

SUMMARY OF THE INVENTION

The present invention, generally speaking, reduces memory storage and memory bandwidth requirements of a color laser printer (or other printer having real-time printing constraints) by representing image information in a compressed format throughout the rendering process. At any one time during the rendering process, preferably, only a single scan line is expanded to the full, uncompressed raster format required for eventual printing. The rendered scan line is then recompressed and stored in memory. When all scan lines have been processed and are stored in memory in compressed format, each scan line is then, in sequence, expanded in real time and sent to the printer.

Preferably, the invention, in effect, keeps the image information in compressed form for as long as possible, expands as little of the image as possible at a time (e.g., a single scan line), and leaves that portion of the image in expanded form for as short a time as possible, quickly recompressing and storing it. Memory and memory bandwidth requirements are therefore greatly decreased. Furthermore, since the memory requirements for the uncompressed rasters are so small, extremely fast memory storage may be used, thus further accelerating the overall process without great cost penalty.

In accordance with another aspect of the invention, all requests are reduced to an extremely simple set of operations that can be implemented with very inexpensive hardware or with efficient and easy-to-optimize software procedures.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 4:
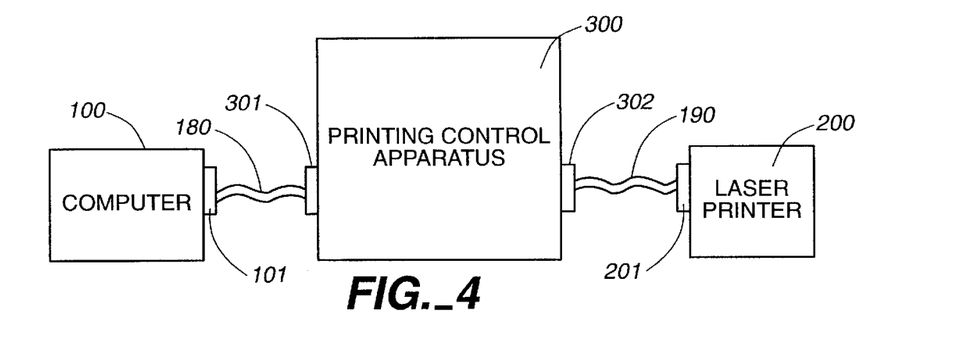
FIG. 4 a generalized block diagram showing the environment of the present invention.

Referring now to FIG. 4, a computer 100 and a printing control apparatus 300 are interconnected via a first communication link 180. The communication link 180 may be a cable or, more generally, any kind of communication link able to carry digital information, whether serial or parallel in nature, such as a network (wired or wireless, point-to-point, etc.). The first communication link 180 is coupled to an external connector 101 of the computer 100 and to a first interface 301 of the printing control apparatus 300. The communication link 180 carries print instructions between the computer 100 and the print control apparatus 300. The apparatus 300 is also connected with a printer 200 (for example a color laser printer of a known type) via a second communication link 190. The second communication link 190 is coupled to a second interface connector 302 of the apparatus 300 and to an interface connector 201 of the printer 200. The communication link 190 carries image data and control commands from the printing control apparatus 300 to the printer 200.

Figure 5:
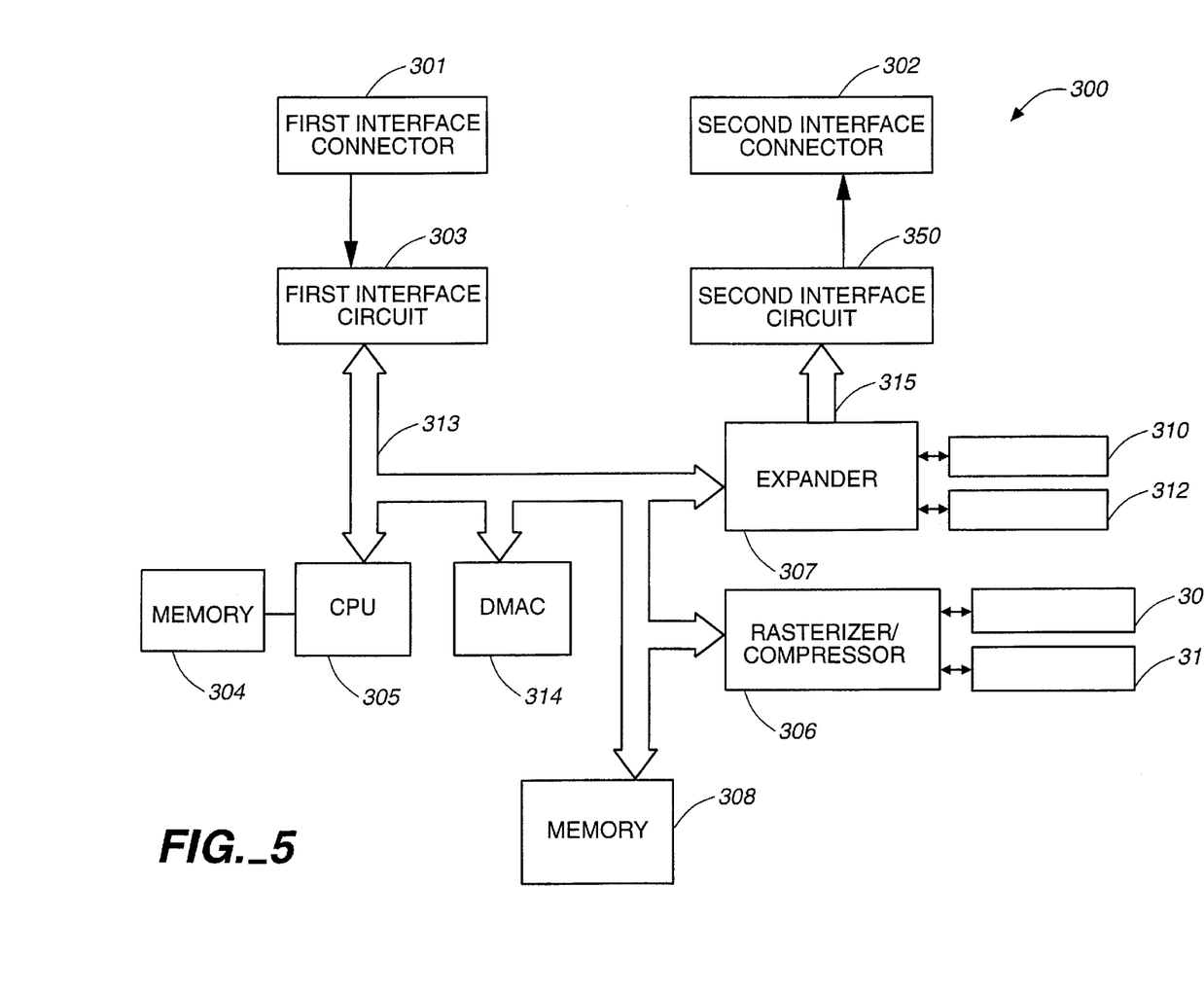
FIG. 5 is a block diagram of a rendering apparatus that may be used in the present invention.

The construction of the printing control apparatus 300 will now be described in more detail with reference to FIG. 5. In FIG. 5, the first interface connector 301 for receiving data from the computer 100 is connected to a first interface circuit 303 that accepts the received data. The first interface circuit 303 is of a type well-known in the art (for instance, RS232 serial, Centronics parallel, etc.) and will not be further described.

The other end of the first interface circuit is coupled to a bus 313 that permits data exchanges between the interface circuits and a CPU 305, connected to a program and data memory 304. The bus 313 is also connected to a rasterizer/compressor 306, an expander circuit 307, a memory 308 and a DMAC (Direct Memory Access Controller) 314. The DMAC 314 effects direct memory transfer between the various devices. Note that, instead of providing a separate program and data memory 304, the memory 308 could also be used for this purpose.

The second interface circuit 350 is connected on its input side to the expander 307 via a bus 315, and on its output side to the printer interface connector 302. The second interface circuit 350 is described more particularly below in conjunction with FIG. 14.

The rasterizer/compressor 306 includes at least one, preferably two buffers 309 and 311, used to temporarily hold expanded image data. The buffers 309 and 311 are illustrated separately for clarity. Similarly, the expander 307 includes at least one buffer 310 and, optionally, an additional buffer 312, used to hold expanded image data to be output to the printer. Again, the buffers 310 and 312 are illustrated separately for clarity.

In general, the image rendering process performed by the printing control apparatus 300 includes the following succession of steps:

1. A page description is received from an application program (running on the computer 100 in FIG. 4) in a page description language (PDL) such as Postscript, for example;
2. PDL statements received from the application program are interpreted into rasterization requests, which in turn are broken down into a series of color applications. These applications represent graphic objects in a compressed format;
3. Color applications are subsequently converted into scan operations which are appended to data structures representing their corresponding scan line;
4. Each scan line is rendered one-by-one to produce raster data and is then compressed and stored; and
5. Once the whole page is rendered and compressed, the compressed raster data is expanded and sent to the printer (e.g., the color laser printer 200 in FIG. 4).

Step 1 above (a program issuing a page description) is well-known. Each of the subsequent steps will be described in greater detail.

In order to provide compatibility with various PDLs, it is necessary to translate rasterization requests generated by a particular PDL into a common set of commands that may be used across a variety of PDLs. Therefore, in the present printer controller, rasterization requests are further broken down into a small number of very simple color applications. For example, in a preferred embodiment, one form of color application is used for multiple-color applications, and another form of color application is used for single-color applications.

For multiple-color applications, color applications are of the following form:

At <x,y>: <Color 1, n1> <Color2, n2> . . .

As may be readily appreciated, the foregoing application specifies that, beginning at a point given by the coordinates x and y, a number of pixels n1 in the x direction are to be set to a first color, Color 1, after which a number of pixels n2 are to be set to a second color, Color 2, etc.

For single-color applications, the color always remains the same. Therefore, color applications are of the following form:

At <x,y>: Color <paint n1> <skip n2> <paint n3> . . .

As may be readily appreciated, the foregoing application specifies that, beginning at a point given by the coordinates x and y, a number of pixels n1 in the x direction are to be set to the specified color, after which a number of pixels n2 are to be skipped (i.e. left in whichever color state they were), after which a number of pixels n3 in the x direction are to be set to the specified color, etc.

Rasterization requests (generated by the PDL interpreter) are processed and broken down into color applications using a set of simple routines as the rasterization requests are received from the PDL interpreter. The specific routines used to perform this decomposition are well within the understanding of one of ordinary skill in the art and will therefore not be further described.

Figure 3:
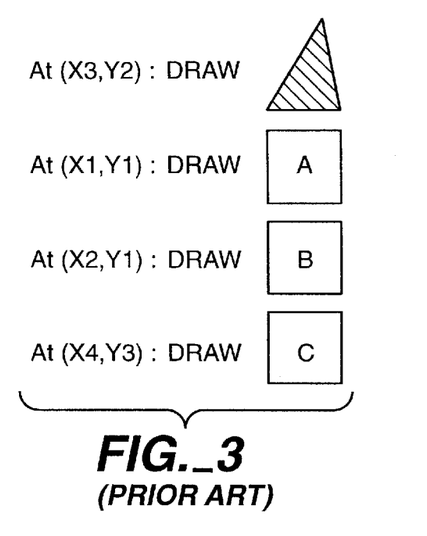
FIG. 3 is an illustration of an unsorted set of rasterization requests.

As color applications are produced they are converted to scan operations of a type described in detail below and queued in accordance with an organizational scheme such as one of the organizational schemes previously described. That is, the present rendering technique may be applied by setting up the scan operations using any of the various conventional methods of setting up the rasterization process, including those described in relation to FIG. 1, FIG. 2 and FIG. 3. Converting color applications to scan operations is performed using, again, very simple routines well within the understanding of one of ordinary skill in the art. An example of such a conversion is described below in connection with FIG. 8.

Scan operations represent the image described by the PDL rasterization requests in a compressed format. Furthermore, the compressed representation of the image is produced without first expanding the image or rendering any portion of the image.

Figure 6:
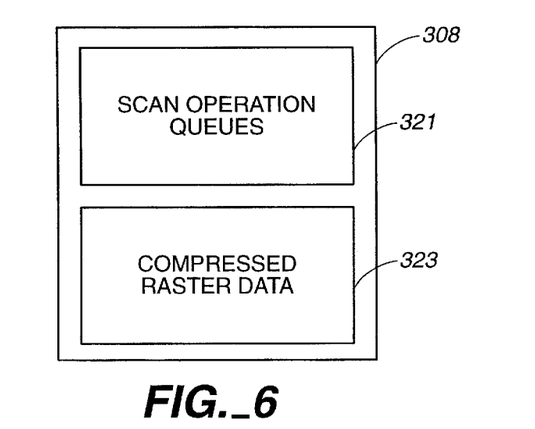
FIG. 6 is a diagram illustrating two principal storage areas within the memory 308 of FIG. 5.

Referring to FIG. 6, in a preferred embodiment, scan operations are stored in a queue structure within an area 321 of the memory 308. A separate area of memory, 323, is used to store compressed raster data produced by the rasterizer/compressor 306 as described hereinafter. Both arrays 321 and 323 can be allocated dynamically within memory 308 (rather than keeping a fixed allocation for each one). Furthermore, the memory 308 can contain a queue of the compressed raster data for as many pages as fit in it.

Figure 7:
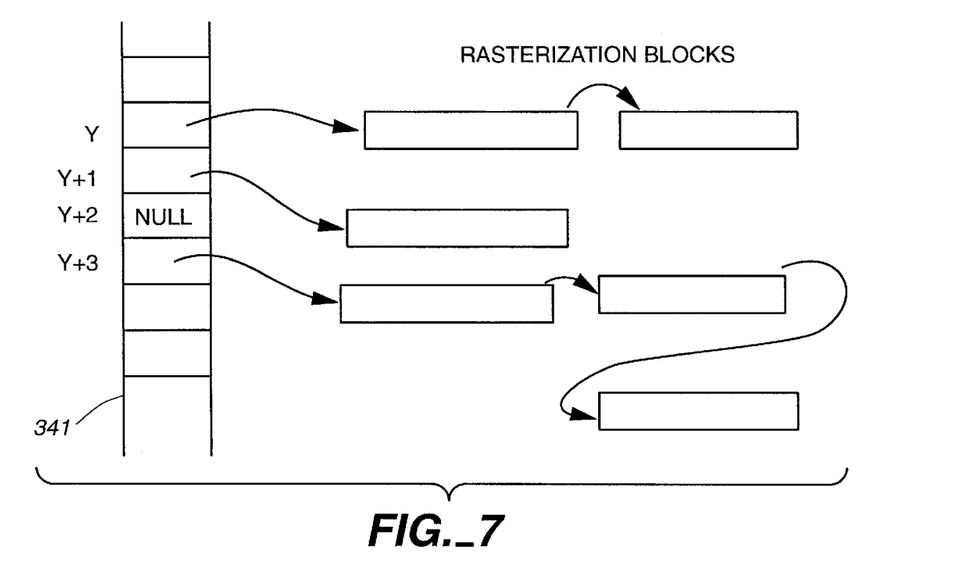
FIG. 7 is a diagram illustrating a scan operation queue structure within the memory area 321 of FIG. 6.

Within the memory area 321, scan operations are organized in a manner illustrated in FIG. 7. A scan line index 341 forms the head of a series of linked lists, or queues. As scan operations are produced (in response to rasterization requests), the scan operations are appended to the last rasterization block for their scan line. Hence, scan operations are sorted by y coordinate but otherwise are stored in rendering request order. Storing the scan operations in rendering request order ensures that the page ultimately printed is the same as the page described by the PDL source.

The scan operation queues are used to render and subsequently compress each scan line, one-by-one, to produce compressed raster data, which is stored in the area 323 within the memory 308. The rasterization process is started either 1) when a page is completed or 2) when there is no more memory available for rasterization blocks (in the area 321 within the memory 308).

For simplicity, the present description assumes that sufficient memory is available in the area 323 of the memory 308 to store compressed raster data for an entire page. In the case of a typical image, significant compression of the image will be achieved, allowing the area 323 of the memory 308 to be much smaller than a full-page bitmap. In the extreme case, however (where the entropy of the source image is very high), little or no compression will be achieved. If the memory area 323 of the memory 308 is smaller than a full-page bitmap, the printer controller 300 may not be able to render the page using non-lossy compression techniques. This case may be provided for by 1) not rendering source images having unusually high entropy, but rather signalling an error condition; 2) providing a full-page bitmap, therefore sacrificing the potential reduction in memory requirements in favor of being able to render an arbitrary image; or 3) using lossy compression techniques (known and described in the prior art) to compress the image to a size that will fit within the area 323 of the memory 308.

The rasterizer/compressor 306 of FIG. 5 operates in two phases, a rasterization phase and a compression phase. During the rasterization phase, scan operations queued up for a particular scan line are executed by the rasterizer to produce raster data. During a compression phase, the raster data is compressed back into the same compressed format as the scan operations and stored in memory. When rasterization has been completed for all scan lines, the stored, compressed raster data is then expanded scan line by scan line and output to the printer.

Because the raster data is compressed back into the same compressed format as the original scan operations, the rasterizer portion of the rasterizer/compressor 306 and the expander 307 may in large part use the same format scan operations and may both be implemented in a similar fashion. In an exemplary embodiment, scan operations used by both the rasterizer 306 and the expander 307 later expansion. Furthermore, the rasterizer receives scan operations not in scan-line order but in rasterization request order. The job of the rasterizer is to manipulate pixels at different times, possibly throughout the scan line, to arrive at a scan line representation that is the cumulative effect of all of the scan operations executed in the proper order.

For example, to form a shadow border, a box of a first color may be drawn but then placed in back of a box having a fill pattern of a second color. In a given scan line, a string of pixels may as a result first be set first to the first color and afterward to the second color. Therefore, in addition to the foregoing scan operations, the rasterizer 306 uses the following operations, not used by the expander 307, in order to change position within a scan line:

| OPERATION | ACTION |
|---|---|
| \<Set x\|New x\> | Rasterizer only: Changes the x address of the current pixel to the pixel designated by the New x |

| | ACTION | |
|---|---|---|
| OPERATION | Rasterizer | Expander |
| \<Set Color\|New Color\> | Makes the New Color the current color (stored in a color register) and writes it to a current scan line array as the color for at least the current pixel and possibly some number of subsequent pixels (if followed by the Repeat scan operation, below). | Makes the New Color the current color and outputs it to the print engine as the color for at least the current pixel in the current scan line and possibly some number of subsequent pixels (if followed by the Repeat scan operation, below). |
| \<Copy Color\> | Makes the color of the corresponding pixel in the previous scan line (stored in a previous scan line array) the current color and writes it to the current scan line array as the color for at least the current pixel and possibly some number of subsequent pixels (if followed by the Repeat scan operation, below). | Makes the color of the corresponding pixel in the previous scan line (stored in a previous scan line array) the current color and outputs it to the print engine as the color for at least the current pixel and possibly some number of subsequent pixels in the current scan line (if followed by the Repeat scan operation, below). |
| \<Copy String\> | Writes to the current scan line array colors of some number of corresponding pixels in the previous scan line (stored in the previous scan line array) as the colors for that number of pixels, the number of pixels being specified by a following Repeat scan operation. | Outputs to the print engine colors of some number of corresponding pixels in the previous scan line (stored in the previous scan line array) as the colors for that number of pixels in the current scan line, the number of pixels being specified by a following Repeat scan operation. |
| \<End of Line\> | Causes the rasterizer/compressor to enter compression phase. | Sets the x address of the current pixel value to zero and sets the color to some initial color. |
| \<Repeat\|RepLg\> | Specifies a repeat length for the Set Color scan operation, the Copy Color scan operation or the Copy String scan operation. | |

A few key distinctions exist between operation of the rasterizer and operation of the expander. First, the expander receives scan operations strictly in scan-line order as a result of the previous operations of the rasterizer. Second, the expander outputs the expanded raster data directly to an output pipeline, from which the data is consumed by the print engine. The rasterizer, on the other hand, computes a scan line, but rather than outputting the scan line to the output pipeline, recompresses and stores the scan line for -continued

| OPERATION | ACTION |
|---|---|
| | value. |
| \<Skip\|Δx\> | Rasterizer only: Changes the x address of the current pixel by skipping |

| OPERATION | ACTION |
|---|---|
| | over some number of pixels given by Δx. |

-continued

Note, however, that the actual scan operation encoding employed may vary. For example, Huffman coding or a variant thereof may be used to efficiently encode the foregoing operations.

Figure 8:
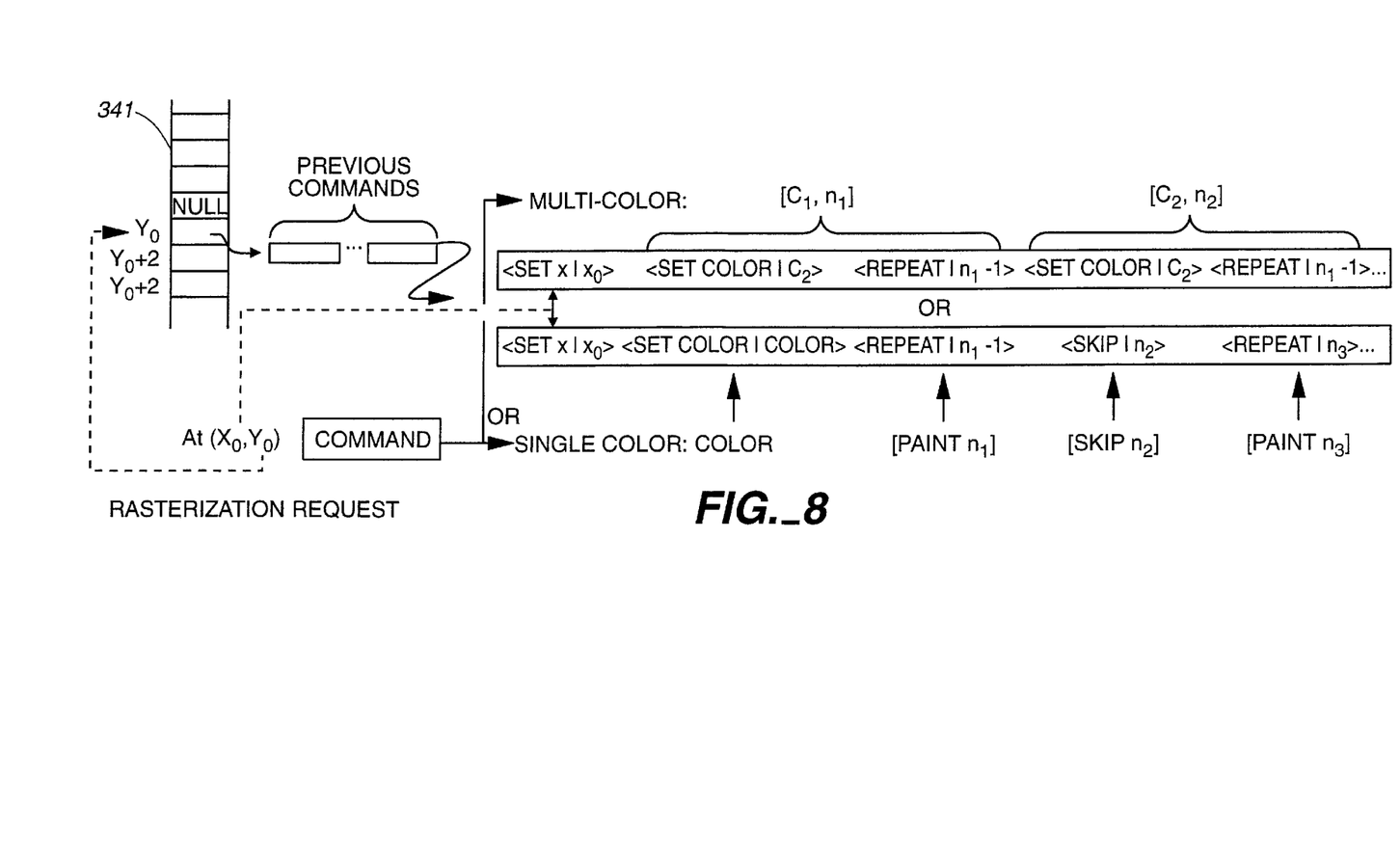
FIG. 8 is a diagram illustrating conversion of color applications to scan operations and the queuing of scan operations.

The process whereby rasterization requests are received and translated to color applications and in turn to the foregoing scan operations, which are then enqueued, may be more clearly understood with reference to FIG. 8. A typical rasterization request is assumed to have the form At $(x_0, y_0)$, REQUEST, where REQUEST is one of the requests RAST1, RAST2 and RAST3 previously described. The coordinate $y_0$ is used determine where to queue the translated scan operations. The translated scan operations will affect scan lines $y_0$, $y_0+1, \ldots, y_0+h-1$, where h is the height of the object associated with the rasterization request. A scan operation affecting scan line y will be queued to the last rasterization block for scan line y.

Two possible scenarios are illustrated. Either the REQUEST requires the application of only a single color, in which case it is translated into a series of Single Color color applications, or it requires the application of multiple colors, in which case it is translated into a series of Multi-Color color applications. These color applications are then translated into the foregoing scan operations. In either case, the first scan operation is a Set x scan operation, which is used to set the x coordinate to the value $x_0$.

Recall that, for multiple-color applications, color applications are of the following form:

[Color 1, n1] [Color2, n2] . . .

where square brackets have been used to distinguish color applications from scan operations. As seen in FIG. 8, each Multi-Color application is translated into a succession of pairs of scan operations, each pair corresponding to one of the brackets above. For each field [Color, n], a Set Color scan operation is used to set the color to the requested color and a second Repeat scan operation is used to repeat that color the appropriate number of times. The Set Color scan operation itself causes application of the color to one dot. The Repeat scan operation therefore specifies a value one less than that of the corresponding color application.

Single Color applications, as previously noted, are of the following form:

Color <paint n1> <skip n2> <paint n3> . . .

The application translates first into a Set Color scan operation used to set the color to the requested color. Next, a Repeat scan operation is used to repeat that color the appropriate number of times. Skip fields are translated into Skip scan operations. Further Repeat and Skip scan operations are then used to selectively apply the specified color to different pixels and pixel groups throughout the scan line.

Figure 9:
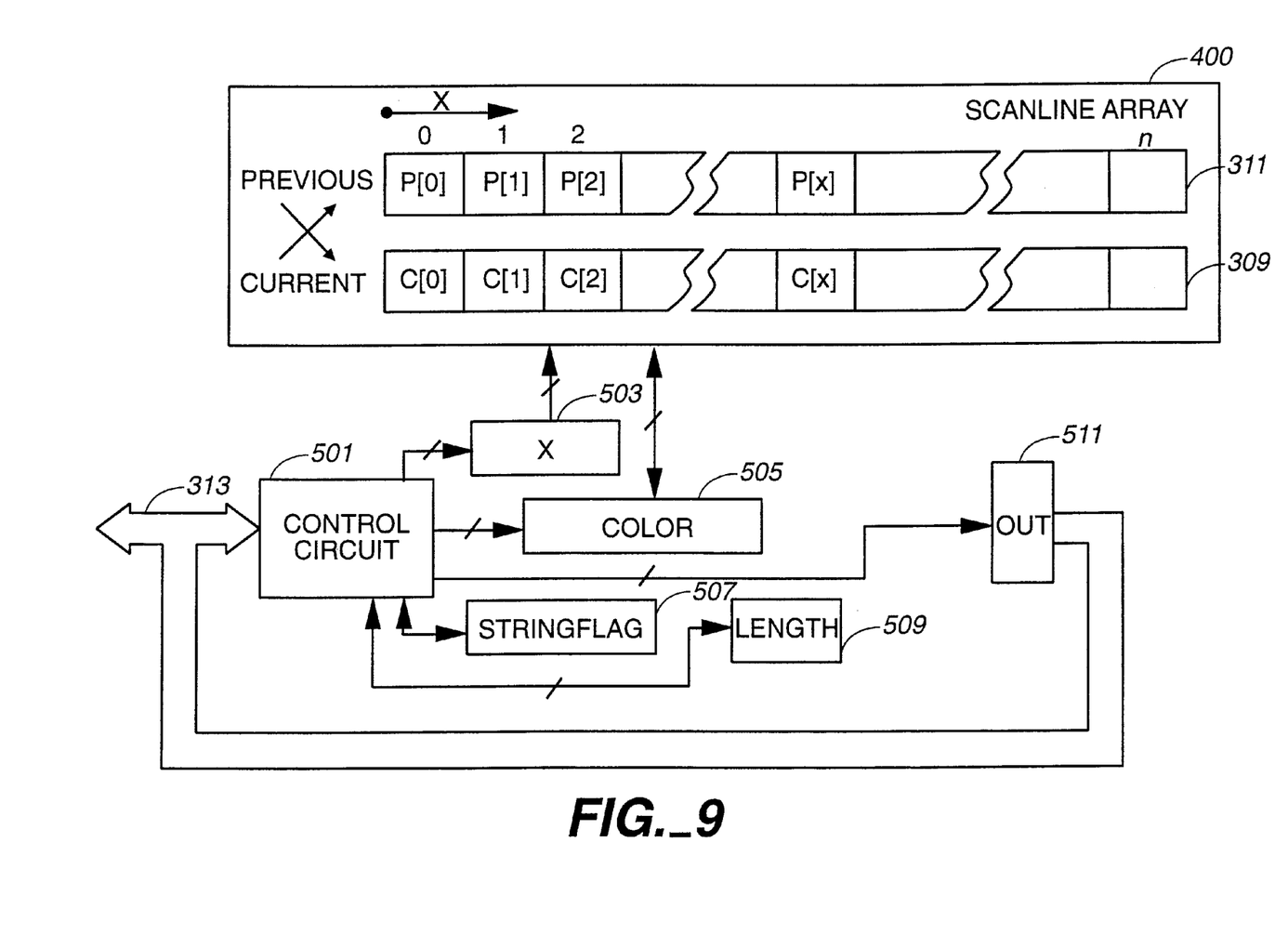
FIG. 9 is a block diagram of the rasterizer/compressor 306 of FIG. 5.

Referring to FIG. 9, an exemplary implementation of the rasterizer/compressor 306 is shown. Note, however, that other implementations of the rasterizer/ compressor are also possible, for instance ones based on a run length encoded version of the scan line rather than the pixel array based version presented here. In the rasterizer/compressor 306 of FIG. 9, a control circuit 501 is connected to the bus 313 and receives from the bus 313 a sequence of scan operations describing a scan line, each scan operation being one of the foregoing scan operations. The control circuit 501 is also connected to an X register 503, a color register 505, a StringFlag register 507, a length register 509, and an output register 511. The X register 503 and the color register 505 are connected to a memory 400, to an address input and a data input of the memory 400, respectively.

The memory 400 is used to hold the two scan line arrays 309 and 311 shown in FIG. 5. Each location in the scan line arrays holds the color for one pixel of the scan line, and each array has a number of locations equal to the number of pixels in a scan line, n, with the pixels being indexed by the value of X. One of the scan line arrays holds data for the current scan line and the other scan line array holds data for the previous scan line. Because data in the current scan line will often closely resemble data in the previous scan line, this arrangement allows a high degree of compression to be achieved. In other arrangements where compression is not an issue or is achieved differently, only one scan line array may be needed.

At the end of processing for each scan line, the roles of the scan line arrays 309 and 311 are reversed such that what was the current scan line array, C, becomes the previous scan line array and what was the previous scan line array, P, is used as the current scan line array.

Figures 10, 13, 14:
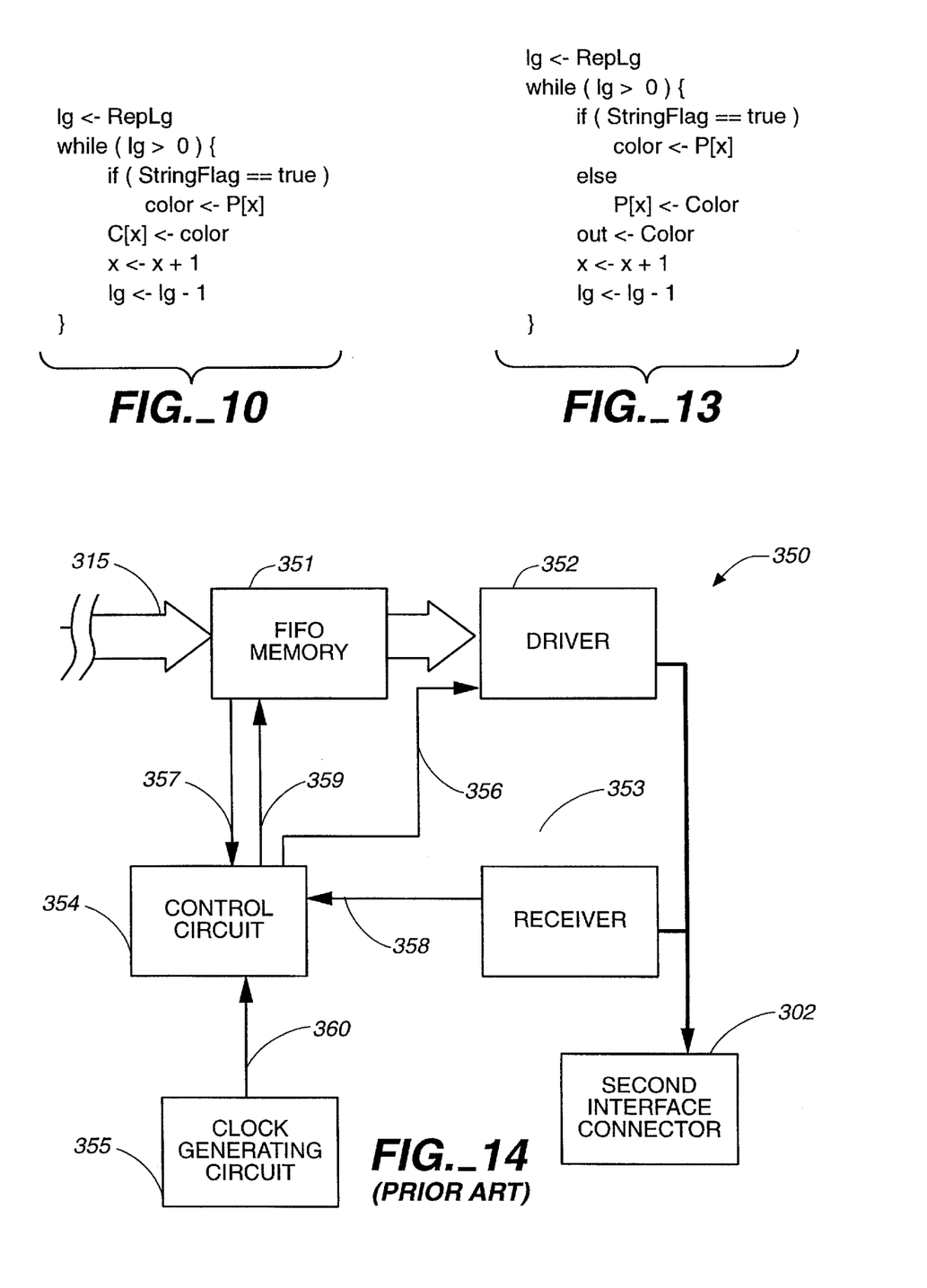
FIG. 10 is a code segment that may be used to execute a Repeat scan operation during the rasterization phase within the rasterizer/compressor 306 of FIG. 5.
FIG. 13 is a code segment that may be used to execute a Repeat scan operation within the expander 307 of FIG. 5.
FIG. 14 is a block diagram of the second interface circuit of FIG. 5.
Figure 11:
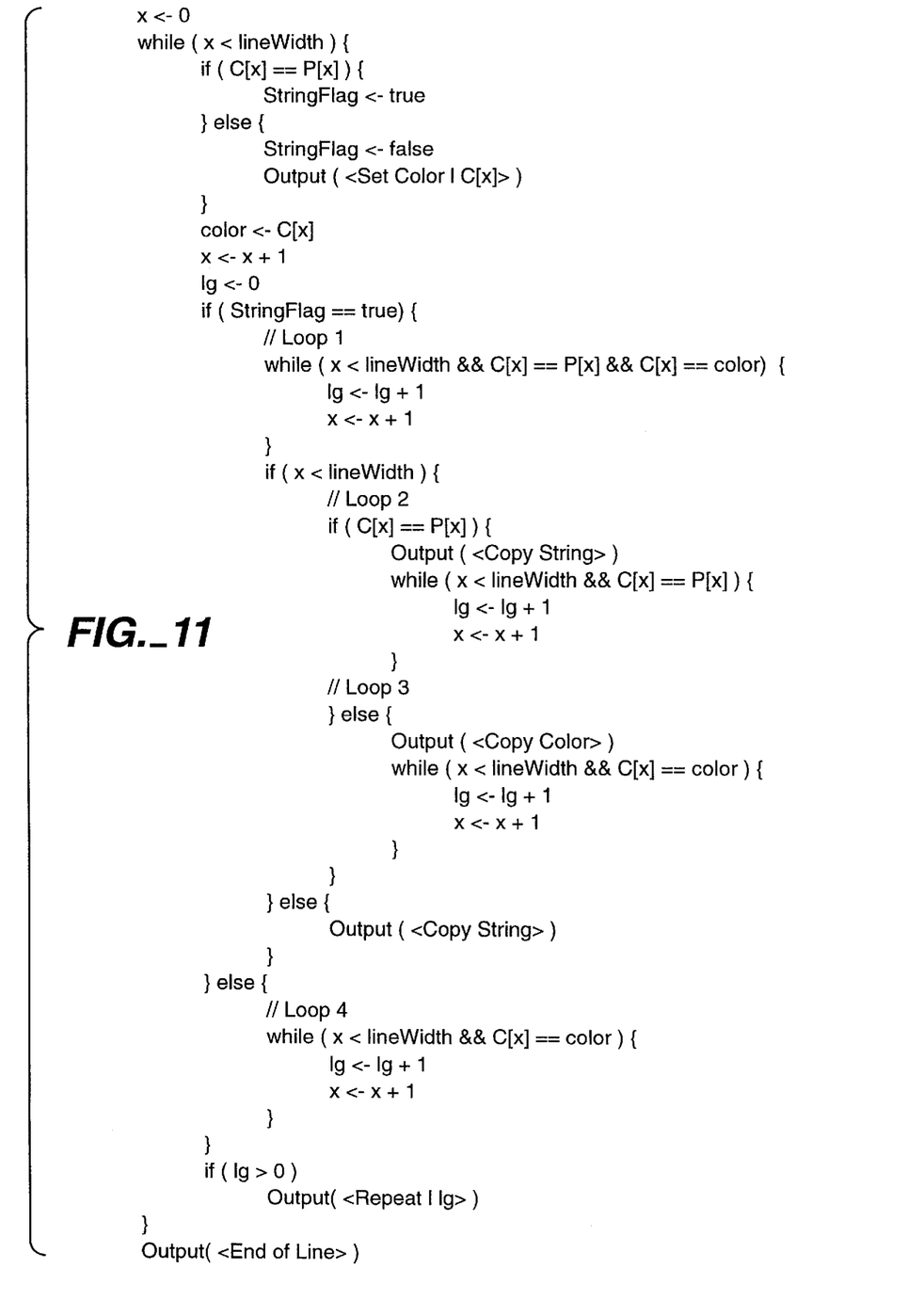
FIG. 11 is a code segment that may be used to execute the compression phase within the rasterizer/compressor 306 of FIG. 5.

The foregoing scan operations, described previously in general terms, may now be specified in terms of their execution steps, as follows:

| SCAN OPERATION | EXECUTION STEPS |
|---|---|
| <Set Color \| New Color> | StringFlag ← False<br>Color ← New Color<br>C[x] ← Color<br>x ← x + 1 |
| <Copy Color> | StringFlag ← False<br>Color ← P[x]<br>C[x] ← Color<br>x ← x + 1 |
| <Copy String> | StringFlag ← True<br>Color ← P[x]<br>C[x] ← Color<br>x ← x + 1 |
| <Repeat \| RepLg> | See FIG. 10 |
| <Set x \| New x> | x ← New x |
| <Skip \| Δx> | x ← x + Δx |
| <End of Line> | Enter compression phase-See FIG. 11 |

The Repeat scan operation is executed by a series of steps described in FIG. 10. When the Repeat scan operation is executed, the StringFlag 507 will have been set previously, to false if the next preceding scan operation was a Set Color scan operation or a Copy Color scan operation, or to true if the next preceding scan operation was a Copy String scan operation. The length register 509 is set to the repeat length, RepLg, and is decremented after every pass through a code loop. At each pass, if StringFlag is true, the color in location x in the previous scan line array is copied to the color register 505 from where it is then copied to the location x in the current scan line array. The value of x is then incremented, and the length register 509 is decremented. If the StringFlag 507 is false, then the contents of the Color Register are simply repeated once for each Repeat scan operation.

When an End of Line scan operation is encountered, rasterization of the current scan line is complete and the scan line is ready to be recompressed. The steps executed during compression are described in FIG. 11. The output of the compression phase is a series of scan operations describing the rasterized scan line. These scan operations are stored in respective scan line queues within the compressed raster data area 323 (FIG. 6) of the memory 308.

Referring to FIG. 11, the compressor begins compression at the beginning of the scan line by setting the index value x to zero. The color of the current scan line at the index value and the color of the previous scan line at the same index value are then compared in an effort to identify a first type of run in which the color varies from pixel to pixel but varies in the same way as on the previous scan line. If identity is found, the StringFlag 507 is set to true; otherwise, the Set Color scan operation is output. The color of the current pixel is stored in the color register 505. Storing the color of the current pixel in the color register allows runs of a second type to be identified in which the color remains the same from pixel to pixel.

Next, the length of any run is ascertained. For each one of Loops 1–4 in FIG. 11, each time the colors in a run satisfy a given condition, the length register 509 (initially set to zero) is incremented. The X register 503 is also incremented.

A run may be of both types. That is, pixels x to x+n in the previous scan line may all be of a given color, and pixels x to x+n in the current scan line may all be of the identical color. If pixel x+n+1 in the current scan line is of a different color from both pixel x+n+1 in the previous scan line and pixel x+n in the current scan line, then it makes no difference which run is chosen. In the routine of FIG. 11, the first type of run has arbitrarily been chosen (Loop 1). However, if pixel x+n+1 in the current scan line is of the same color as pixel x+n+1 in the previous scan line, then the first type of run can be extended, and compression will be increased by choosing the longer first type of run over the shorter second type of run (Loop 2). Similarly, if pixel x+n+1 in the current scan line is of the same color as pixel x+n in the current scan line, then the second type of run can be extended, and compression will be increased by choosing the longer second type of run over the shorter first type of run (Loop 3). If no run of both the first and second types or of the first type only is found, then it remains to determine whether a run of the second type only may be found (Loop 4).

Therefore, if StringFlag is true, indicating that the current pixel is the same color as the corresponding pixel in the previous scan line, the length of a run of both types (the same color and also equal to the corresponding run in the previous line) is first ascertained by Loop 1. After that the run is extended if at all possible. Loop 2 checks if it may be extended into a longer run of colors identical to the previous scan line. If Loop 2 succeeds, a Copy String scan operation is generated. Loop 3 attempts to extend it into a run of the same color. If Loop 3 succeeds, a Copy Color scan operation is generated.

If StringFlag is false, the length of the second type of run (but starting with a color different from that on the previous scan line) is ascertained by checking the identity of the colors of subsequent pixels in the current scan line with the color stored in the color register 505. This is done by Loop 4. Again, each time the colors are the same, the length register 509 and the X register 503 are both incremented.

No run of either type may be found, in which case the length stored in the length register 509 remains zero. In this instance, x will have already been incremented and the foregoing operations are repeated. If a run was found, then a Repeat scan operation is output with the length of the run, and the foregoing operations are repeated with the new x value. When the final pixel has been processed, an End of Line scan operation is output, and the registers are reset for the next scan line. When all of the scan lines have been rasterized and compressed, the compressed image may then be expanded by the expander 307 and output to the print engine.

Note that, once a scan line has been placed in the scan line array 400, it does not matter for purposes of compression where that scan line came from or how it was rendered. The identical compression hardware or software may therefore be used in connection with any rasterizer. For example, in some instances, the marking interface of a particular proprietary PDL may not be accessible, but the rasterized image may be accessible as it is being produced. The rasterized image may be compressed on the fly, obviating the need to store the entire raster image.

Figure 12:
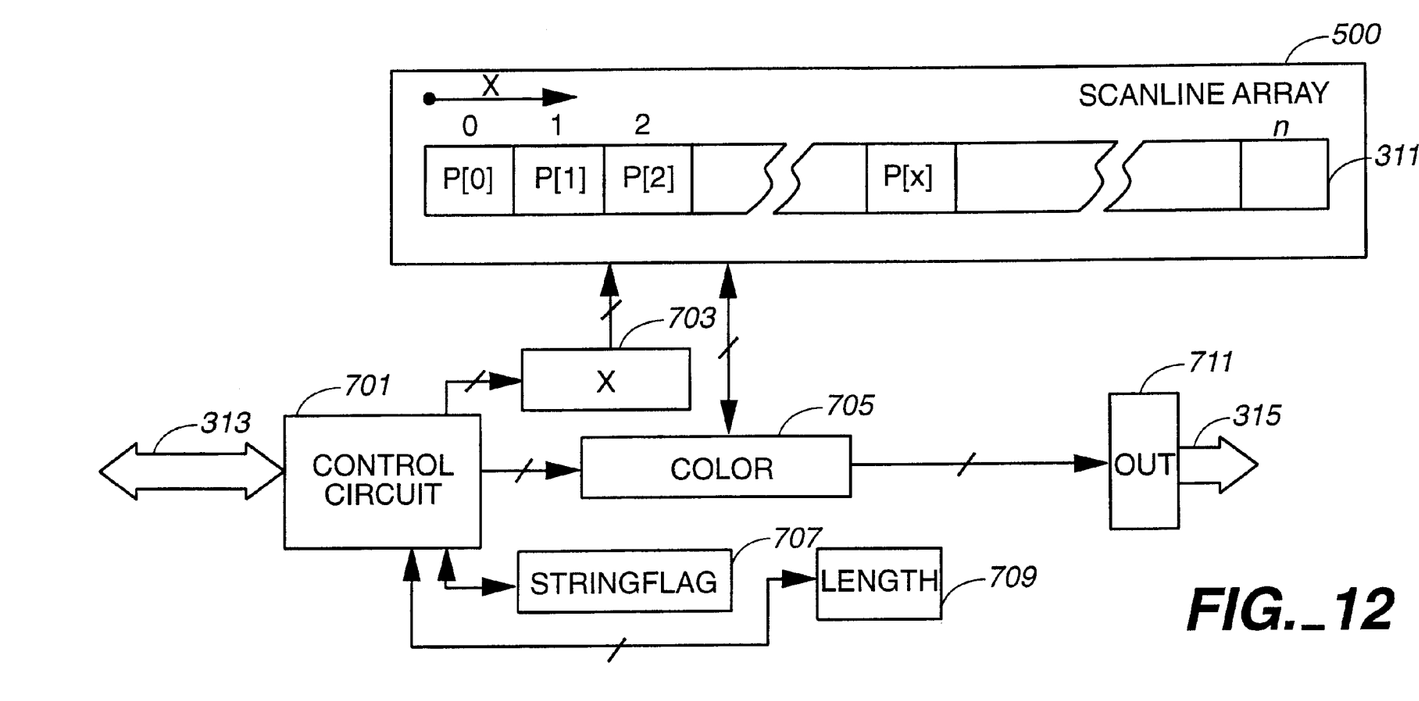
FIG. 12 is a block diagram of the expander 307 of FIG. 5.

Referring to FIG. 12, an exemplary implementation of the expander 307 is shown. The expander can be implemented in a manner very similar to the rasterizer/compressor. A control circuit 701 is connected to the bus 313 and receives from the bus 313 a sequence of scan operations describing a scan line, each scan operation being one of the foregoing expansion scan operations. The control circuit 701 is also connected to an X register 703, a color register 705, a StringFlag register 707, a length register 709, and an output register 711. The X register 703 and the color register 705 are connected to a memory 500, to an address input and a data input of the memory 500, respectively.

The memory 500 is used to hold data for both the current as well as previous scan line. In particular, this memory stores the current scan line up to the access of the current pixel (X register 703), and the contents of the previous scan line between the current pixel and the end of the scan line. Of course, the two scan lines could be stored in their entirety in two buffers used in a ping-pong fashion.

The foregoing expansion scan operations, described previously in general terms, may now be specified in terms of their execution steps, as follows:

| SCAN OPERATION | EXECUTION STEPS |
| --- | --- |
| <Set Color \| New Color> | StringFlag ← False |
|  | Color ← New Color |
|  | C[x] ← Color |
|  | x ← x + 1 |
|  | Out ← Color |
| <Copy Color> | Color ← C[x] |
|  | x ← x + 1 |
|  | Out ← Color |
|  | StringFlag ← False |
| <Copy String> | Color ← C[x] |
|  | x ← x + 1 |
|  | Out ← Color |
|  | StringFlag ← True |
| <Repeat \| RepLg> | See FIG. 13 |
| <End of Line> | x ← 0 |
|  | Color ← InitColor |

The execution steps for the scan operations in the Expander are in large part the same as the execution steps for the corresponding operations in the Rasterizer, with slight variations. The execution steps performed by the expander for the Repeat scan operation are described in FIG. 13 and are in large part the same as the execution steps for the corresponding rasterization Repeat scan operation described in FIG. 10, again with slight variations that will not be further described.

As previous mentioned, the expander outputs the expanded raster data directly to an output pipeline, from which the data is consumed by the print engine. In many cases the printer itself provides the output pipeline, and will request from the expander the successive pixel values in accordance with timing signals generated by the output pipeline. Alternatively, the output data pipeline may be located within the second interface circuit 350 of FIG. 5 and may be of a type known in the art, shown in greater detail in FIG. 14. The data input of a first-in first-out (FIFO) memory 351 is connected to the bus 315. Over the bus 315, the memory 351 accepts data from the CPU 305 or the DMAC 314. The data output of the FIFO memory 351 is connected to a driver 352 for outputting data to the second interface connector 302. A receiver 353 is provided to forward a ready signal 358 from the second interface connector 302 on to a control circuit 354. The control circuit 354 generates a read signal 359 directed to the FIFO memory 351 and a data clock signal 356 coupled to the second interface connector 302 through the driver 352. The timing of the control circuit 354 is controlled by a clock signal 360 generated by a clock generating circuit 355. An empty flag signal 357 of the FIFO memory 351 is input to the control circuit 354.

The output pipeline of FIG. 14 may also be modified to provide for margin generation in a manner known in the art, so as to feed to the printer white space until reaching the left-most pixel of the scan line, and to feed the printer white space after the right-most pixel of the scan line.

In the foregoing arrangement, the actual pixels of the image are produced (during rasterization) from scan operations that are sorted by scan line but not ordered within the scan line, and are used to produce (during compression) scan operations that are both sorted by scan line and ordered within the scan line with the state of each pixel being defined by one and only one command. The compressed-format representation of the pixels is much more compact than the pixels themselves, reducing storage requirements. Furthermore, the actual pixels are themselves only handled once, during the expansion process. As a result, processing bandwidth requirements are drastically reduced and total processing time may be bound by the actual width of the scan line (times a suitable constant), thus satisfying the requirement of processing the scan line fast enough to transfer pixels to the printer in real time.

Also in accordance with the foregoing arrangement, because a single core of simple operations may be used for both rasterization/compression and later expansion, hardware may be designed that performs the simple operations required at very high speed, thereby achieving high printing speeds. The same hardware may be used not only to accelerate rasterization and enable simultaneous operation of the CPU, but may also be used purely for purposes of compression only where the rasterization process is already fixed. For example, if the marking interface of a particular PDL is proprietary and not accessible but the rasterized image is accessible as it is being produced, the rasterized image may be compressed on the fly, obviating the need to store the entire raster image. The same benefits as described previously are also realized in this instance, except that rasterization may be slower, limiting printing speed.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of constructing compressed raster data for a raster that corresponds to a page of one or more image objects, using a memory of predetermined capacity substantially less than that required to store uncompressed raster data for the raster, comprising:
   (a) generating a stream of rasterization requests specifying in sequence how and where the image objects of the page are to be rasterized on the raster;
   (b) decomposing said stream of rasterization requests into a sequence of scan-line-segment rasterization commands, each scan-line-segment rasterization command specifying in a compressed format according to a first compression scheme how and where a scan line segment of the raster corresponding to a portion of the image objects is to be rendered;
   (c) grouping by scan line said sequence of scan-line-segment rasterization commands;
   (d) maintaining in said memory a queue for each scan line, said queue being a sequence of scan-line-segment rasterization commands pertaining to said each scan line in the order said stream is being decomposed; and
   (e) in response to a predetermined condition, converting each scan line to compressed raster data by rendering each scan line according to its queue of scan-line-segment rasterization commands and recompressing the rendered scan line into compressed raster data for the raster;
   (f) repeating (a) to (e) until all rasterization requests of the page have been processed.

2. A method as in claim 1, wherein said converting each scan line to compressed raster data further comprising:
   (I) maintaining in said memory an existing state of said compressed raster data for the raster;
   (ii) rendering raster data for a given scan line in a first pass by decompressing existing compressed raster data pertaining thereto;
   (iii) rendering in a second pass over the raster data from the first pass by decompressing in sequence said queue of scan-line-segment rasterization commands pertaining thereto;
   (iv) recompressing the second pass raster data for said given scan line according to a second compression scheme;
   (v) freeing up memory in said memory by discarding the sequence of scan-line-segment rasterization commands in said queue;
   (vi) updating the existing compressed raster data with the recompressed raster data for said given scan line; and
   (vii) repeating (I) to (vi) for each of the other scan lines of the raster.

3. A method as in any one of claims 1–2, wherein the page of one or more image objects is describable by a stream of page description language (PDL) statements and said series of rasterization requests are generated by interpreting the stream of PDL statements.

4. A method as in any one of claims 1–2, wherein the page of one or more image objects is describable by a stream of graphic commands and said series of rasterization requests are generated by interpreting the stream of graphic commands.

5. A method as in any one of claims 1–2, wherein said predetermined condition includes when all PDL statements of the page have been processed.

6. A method as in any one of claims 1–2, wherein said predetermined condition includes when said memory is determined to be insufficient for further appending of scan line segment rasterization commands to a queue.

7. A method as in any one of claims 1–2, wherein said second compression scheme includes one that has a decompression rate suitable for a print engine.

8. A method as in any one of claims 1–2, wherein said second compression scheme includes a run-length encoding scheme.

9. A method as in any one of claims 1–2, wherein said second compression scheme includes a transform encoding scheme.

10. A method as in any one of claims 1–2, wherein said second compression scheme includes one that is lossy.

11. In rasterizing a page of serially composed image objects into a raster, a method of constructing a compressed raster therefor using a memory of predetermined capacity substantially less than that required to store the raster uncompressed, comprising:

(a) receiving the page as a sequence of descriptions for said image objects;

(b) converting said sequence of descriptions to a corresponding sequence of compressed raster objects, such that the raster is obtainable by cumulative updating of corresponding sequence of decompressed raster objects;

(c) maintaining in said memory a compressed existing state of the raster such that an existing state of the raster is obtainable by decompressing therefrom;

(d) storing a segment of said sequence of compressed raster objects in available portion of said memory, said segment beginning with a compressed raster object that when decompressed is for updating the existing state;

(e) obtaining a new existing state of the raster by cumulative updating the existing state sequentially with all decompressed raster objects of said segment;

(f) compressing the new existing state to arrive at a new compressed existing state of the raster;

wherein (e) to (f) are performed on a portion of the raster at a time such that sufficient portion of said memory is available for temporarily storing decompressed raster objects;

(g) discarding the segment after its raster objects have been integrated into the new existing state, thereby freeing up portion of said memory; and (h) repeating (a) to (g) until all image objects on the page are processed and a final state of the raster in compressed form is obtained.

* * * * *